April 17, 1928.                     J. A. H. BARKEIJ                    1,666,160
                        SLEEVE VALVE INTERNAL COMBUSTION ENGINE
                            Filed March 26, 1925            3 Sheets-Sheet 1
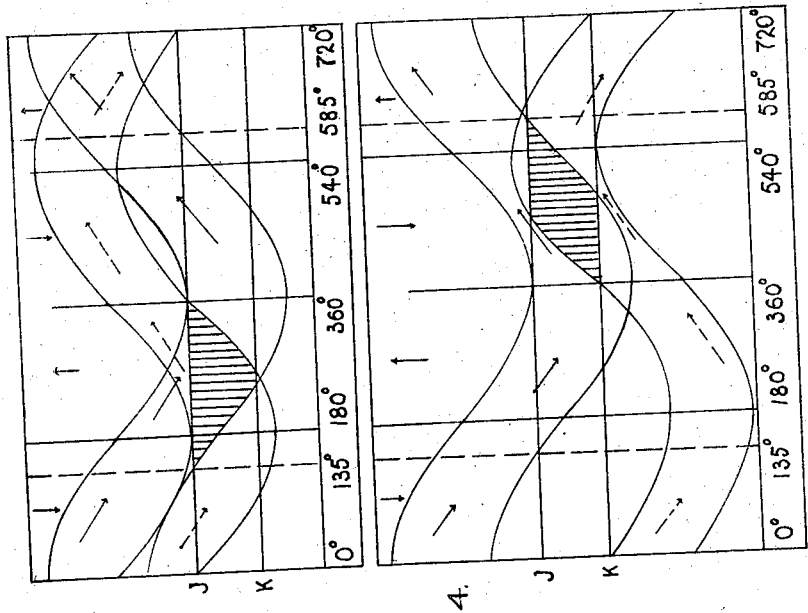
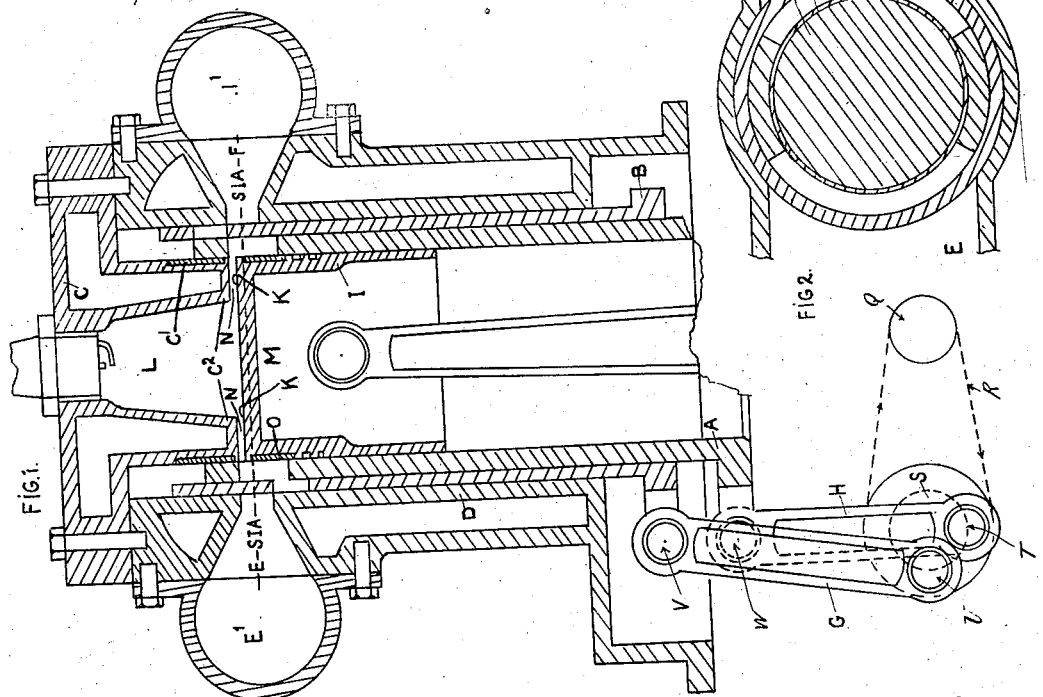
INVENTOR.
J.A.H.Barkeij April 17, 1928.  1,666,160
J. A. H. BARKEIJ
SLEEVE VALVE INTERNAL COMBUSTION ENGINE
Filed March 26, 1925   3 Sheets-Sheet 2
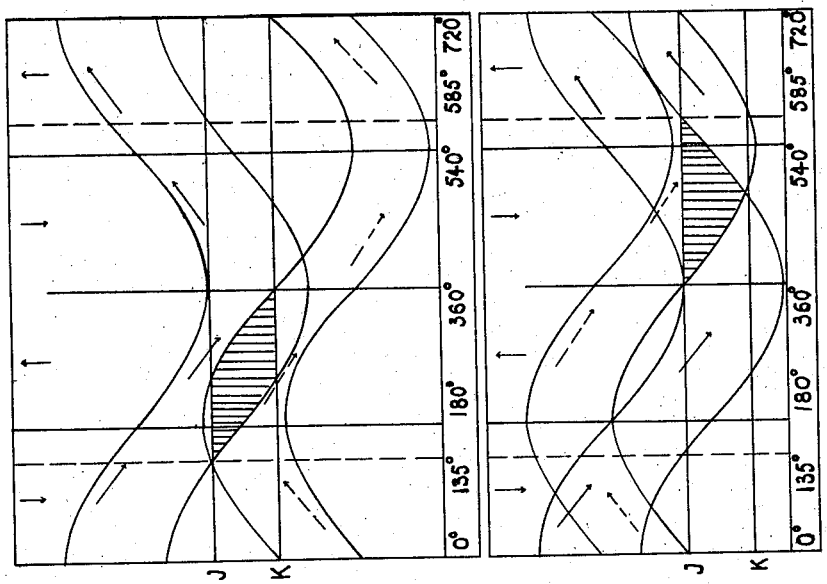
FIG. 8.   FIG. 9.
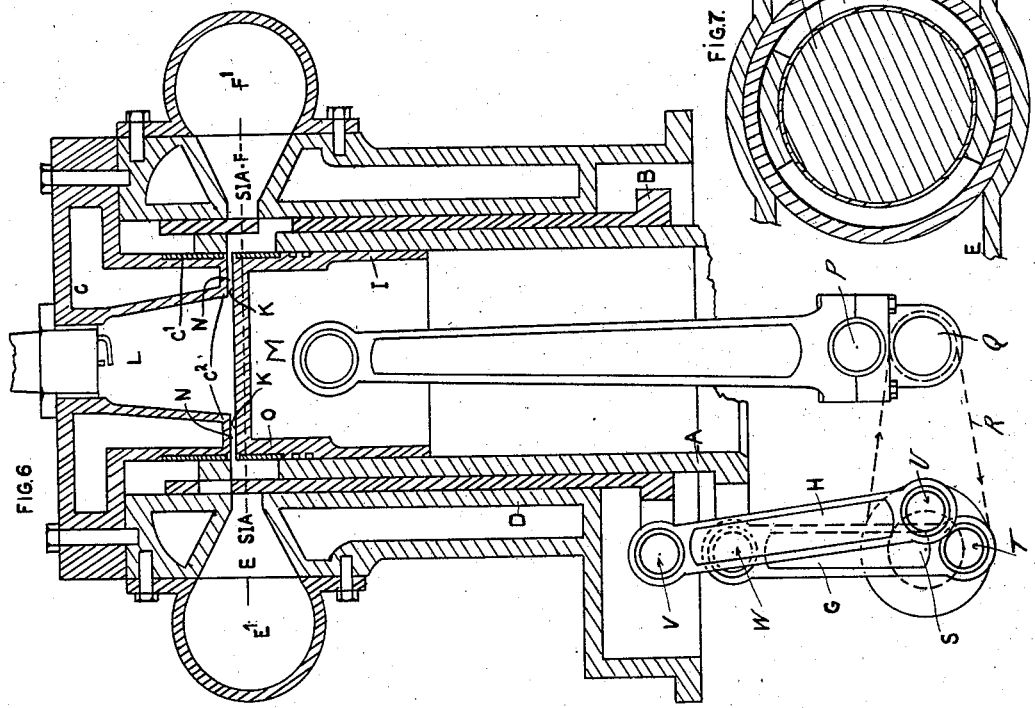
INVENTOR

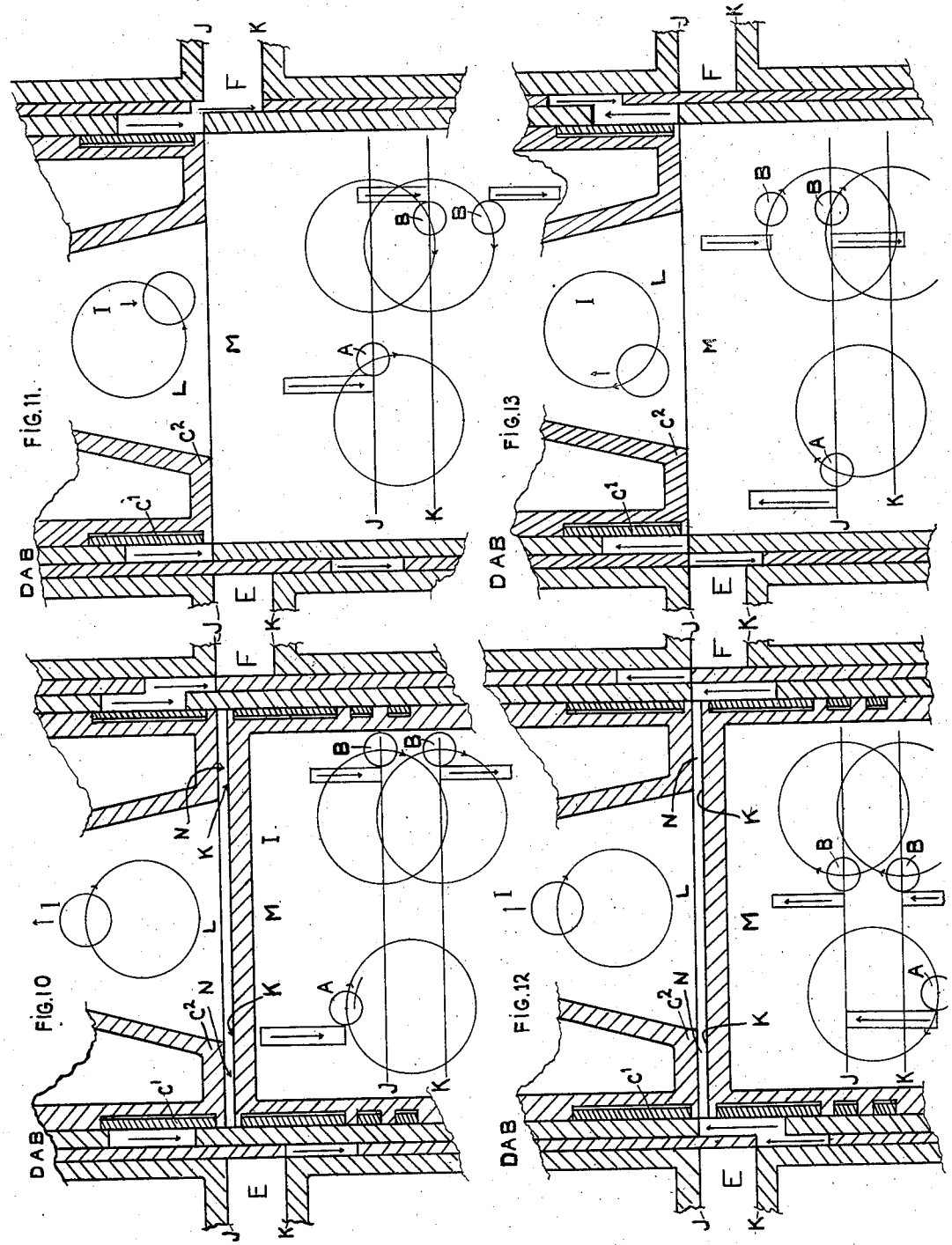

Patented Apr. 17, 1928.

1,666,160

UNITED STATES PATENT OFFICE.

JEAN A. H. BARKEIJ, OF LOS ANGELES, CALIFORNIA.

SLEEVE-VALVE INTERNAL-COMBUSTION ENGINE.

Application filed March 26, 1925. Serial No. 18,456.

My invention relates to sleeve valve internal combustion engine.

My primary object is to provide a sleeve valve action whereby the sleeves are so arranged, that during the entire period of the explosion both sleeves travel in the same direction as the piston, thereby reducing to a minimum the friction between piston and inner sleeve, between inner sleeve and outer sleeve, between outer sleeve and cylinder wall. This reduction of friction improves the lubrication difficulties encountered in this type of engine, and has moreover a favorable influence on the wear of the whole sleeve valve driving mechanism, reduces the stresses in the eccentric shaft and reduces the stretch in the silent chain between crankshaft and eccentric shaft. In case gears are used the action will be more silent.

My second object is to make an explosion chamber of such a shape that the piston in the top dead center position approaches the broad projecting edge of the detachable cylinder head in the inner sleeve so nearly, that a violent turbulence will be created by the sudden change of the form of the explosion chamber at the end of the compression cycle exactly before explosion takes place. The outer sleeve closes the exhaust port in the cylinder wall upwardly, thereby favoring or rather making possible the above construction arrangement. This construction has the advantage that the piston rings slides over a considerable portion of that part of the inside of the inner sleeve, which slides over the rings or junk ring in the head. In the present construction the overlapping of these two areas is very small. The advantage is a more equal lapping of the inside of the inner sleeve, which is the most important part to obtain and keep a compression and explosion-tight cylinder.

My third object is to distribute the heat of explosion more equally over both sleeves than in the existing types. The exhaust slot in the outer sleeve moves upwards from the exhaust port in the cylinder wall instead of downwards as in existing types. This portion of the outer sleeve is heated during the explosion period and will be cooled during the inlet and compression period from two sides, as it will lose its heat towards the water-cooled projection in the inner sleeve. The edges of the inlet slot in the outer sleeve move downward from the inlet port in the cylinder wall instead of upward during the explosion period and will receive more heat during this explosion and exhaust period through the inner sleeve as in existing types, being cooled only on one side. These edges are cooled by the combustible mixture and have to be heated more. According to their functions the inlet side and outlet side of the outer sleeve are heated more and cooled more respectively, so that the heat will be better distributed through the outer sleeve and consequently better in the inner sleeve. This equal distribution of heat will lessen the danger of warped sleeves and will also improve the lubrication difficulties.

My fourth object is to arrange the sleeve action so that this construction can be applied on existing types with changes in the eccentric shaft, in the slots of the outer sleeve and in the detachable head projecting in the inner sleeve.

My fifth object is to arrange the sleeve action so that the distance between the top dead center of the lug for the hinge joint of the inner sleeve and the position of the hinge joint of the outer sleeve is as little as in existing types during 720 deg. revolution of the crankshaft.

My sixth object is to arrange the sleeve action so that the balance of the reciprocating sleeves is not affected unfavorably compared with the present arrangement of the sleeves. The outer sleeve leads the inner sleeve by 60 to 90 deg., exactly opposite to the existing types where the inner sleeve leads the outer sleeve by 60 to 90 deg.

My seventh object is to arrange the movement of the sleeve so that the area of the inlet opening is more constant than the area of the outlet opening and more constant than the inlet area in the existing type, thus favoring a more steady and uniform flow of gases and a greater charge of combustible mixture.

My eighth object is to make possible an arrangement whereby the inlet area can be made greater than the outlet area in proportion to the number of degrees during which the inlet and outlet period last.

My ninth object is to protect the inlet port from exhaust gases escaping between the compression ring $C'$ and the inner sleeve at the moment of the explosion. In the present construction the inlet port is barely covered by the outer sleeve as can be ascertained from Fig. 8. Figs. 3 and 10 show that, the inlet port is liberally covered upon both sides, which is not the case in present construction where the protection is only small on the outer side of the outer sleeve. This is of particular importance in small engines where the present construction offers serious difficulties in this respect on account of the small bore and the small overlappings of the inner sleeve over the compression ring and the small overlapping of the outer sleeve over the inlet port in the cylinder.

Fig. 1 is a sectional view of a cylinder, two concentric sleeves, a piston, and three connecting rods, an eccentric shaft, an inlet and outlet pipe.

Fig. 2 is a horizontal section of Fig. 1 on the line S I A.

Fig. 3 is an analytic representation of a trigonometric equation expressing the relation between the angular distance traveled by the axis of the crankpin on the eccentric shaft and the linear distances traveled by the exhaust slot in both sleeves with respect to the upper and lower edge of the exhaust port in the cylinder wall.

Fig. 4 represents the same thing for the inlet slots in both sleeves with respect to the lower and upper edge of the inlet port in the cylinder wall.

Fig. 5 is the outer surface of the inner sleeve rolled out in the plane of the paper showing a plurality of ports.

Figs. 6, 7, 8, 9, show the same position of parts and the same diagrams for the existing type as is shown in Figs. 1, 2, 3, 4, for my present construction.

Figs. 10, 11, 12, 13 show respectively the positions of the inlet and exhaust slots in the inner and outer sleeves of the present construction with respect to the inlet and exhaust port in the cylinder wall and shows the position of the piston with respect to the projecting head and the position of the upper piston ring with respect to the inlet and exhaust slot in the inner sleeve at the beginning of the explosion, exhaust, inlet, and compression strokes.

In Fig. 1, A represents the inner sleeve; B represents the outer sleeve; C the detachable cylinder head; $C^1$ the junk-ring in the cylinder head; $C^2$ the flat projecting edge of this head; D the cylinder; E the inlet port of the cylinder wall; $E^1$ the inlet manifold; F the exhaust port in the cylinder wall; $F^1$ the exhaust manifold; G and H the connecting rods for the two sleeves A and B; I the piston; O the broad upper piston ring; S the eccentric shaft; P is the crankpin; Q the crankshaft; R the chain driving the eccentric shaft S; U the crankpin connected by connecting rod H to the wrist pin V of the outer sleeve; T is the crankpin connected by connecting rod G to the wristpin W of the inner sleeve. The crankshaft and eccentric shaft have to rotate in clockwise direction to obtain the desired four stroke-cycle function of an internal combustion engine. K is the annular portion of the piston I, which approaches the flat annular portion $C''$ of the detachable cylinder head C, so as to permit only a clearance, which is necessary for mechanical reasons. L represents the combustion chamber having more or less a conical form to diminish the ratio of surface to volume. M is the cylinder-space in which the upper side of the piston moves. N is the clearance space between the piston and cylinder head. The engine is drawn in the position when the exhaust period is finished.

Fig. 2 represents a horizontal section of the cylinder in Fig. 1 on the section SIA; I is the piston; O is the broad upper piston ring; A is the inner sleeve; B is the outer sleeve; E and F the inlet and exhaust port in the cylinder wall; D is the cylinder wall.

Fig. 3 and 4 are diagrams as explained here above.

Fig. 5 is the outer surface of the inner sleeve A, partially rolled out in the plane of the paper. The small slots are indicated by L and the bridges by M and are made in order to prevent the upper piston ring from catching in the slots. Figs. 2 and 7 show however that the small slots can be dispensed with if a junk ring is used instead of the piston ring O.

Fig. 6 represents the construction and movement of the sleeves in the existing types. The piston approaches however in this construction the detachable cylinder head, which is built with a broader and flatter edge than in the existing types in order to show better the spirit of the invention when comparing Fig. 6 with Fig. 7. A is the inner sleeve; B is the outer sleeve; C is the detachable cylinder head of my construction; $C^1$ is the junk ring in this cylinder head; $C^{2n}$ is the flat projecting edge of this head; D is the cylinder; E is the inlet port of the cylinder wall; $E^1$ is the inlet manifold; F is the exhaust port in the cylinder wall; $F^1$ is the exhaust manifold; G and H are the connecting rods for the two sleeves A and B; I is the piston; O is the broad upper piston ring; S is the eccentric shaft. The engine is drawn in the position when the exhaust period is finished.

Fig. 7 is the horizontal section of Fig. 6 on the section SIA. I is the piston; O is the broad upper piston ring; A is the inner sleeve; B is the outer sleeve; E and F are the exhaust ports in the cylinder walls; D is the cylinder wall.

Figs. 8 and 9 are the mathematical diagrams of the exhaust and inlet periods for the existing types and are analytical drawings of a trigonometric equation expressing the relation between the angular distances travelled by the axis of the crankpin on the eccentric shaft and the linear distances travelled by the exhaust and inlet slots in both sleeves with respect to the exhaust and inlet ports in the cylinder wall. Horizontally is represented the distance travelled by the piston during 720 deg. revolution of the crankshaft. The respective lines and degrees indicate the same things as explained for Fig. 4.

Fig. 5 could have been similarly applied to this construction but is omitted as being superfluous.

Fig. 10 are the positions of the exhaust and inlet ports in the sleeves with respect to the exhaust and inlet port in the cylinder wall and the position of the piston with respect to the flat projecting edge $C^2$ of the cylinder head C and the position of the upper piston ring with respect to the inlet and exhaust ports in the inner sleeve at the beginning of the explosion stroke.

Fig. 11 are the positions of the same parts except the piston at the beginning of the exhaust period.

Fig. 12 are the positions of the same parts at the beginning of the inlet period.

Fig. 13 are the positions of the same parts except the piston at the beginning of the compression period. The upper circle I represents the position of the crankpin connected with the working piston. The left circle A represents the position of the eccentric for the inner sleeve A and the two right circles represent the eccentric for the outer sleeve B. The latter is drawn double, as the respective inlet and outlet slots in the outer sleeve are on a different level. The two lines J and K represent again the upper and lower edges of the intake and exhaust port in the cylinder wall.

To understand the nature of the invention to its full extent I will start to explain the meaning of the Figs. 3 and 4 and Figs. 8 and 9. I utilized analytical drawings to illustrate in the way of a moving picture the changing form of the exhaust and inlet area during any position of the crankshaft, and I decided to retain them in this application as a great help in explaining the nature of the invention. The drawings showed at the same time that the exhaust ports closed upwardly and the next step in order to make use of this circumstance was to have the piston approach the cylinder head in such a way that the sudden change in the internal form of the explosion chamber would create a violent turbulence in the gases exactly before explosion takes place. Referring to these mathematical drawings we see that in all four figures, 3, 4, 8, and 9, the two full lines represent respectively the upper and lower edge of the exhaust slot (Figs. 3 and 8) and of the inlet slot (Figs. 4 and 9) respectively in the inner sleeve A and the two pointed lines represent the upper and lower edge of the exhaust slot (Figs. 3 and 8) and the inlet slot (Figs. 4 and 9), respectively, in the outer sleeve B.

The horizontal lines J and K show the upper and lower edge of the exhaust and inlet port in the cylinder wall; the shaded portions represent in proportion the areas of registration of the inlet and exhaust slots in the inner and outer sleeve in front of the inlet and exhaust port in the cylinder wall. The full line arrows indicate the direction of movement of the inner sleeve, the dotted arrows the direction of movement of the outer sleeve and the arrows at the top of these four figures indicate the direction of piston travel. The degrees at the bottom of these figures indicate the angular movement of the crankshaft and the distance enclosed between the number 135 deg. and 585 deg. indicate the number of degrees (450 deg.) during which the exhaust and inlet slots in the inner sleeve are opposite the exhaust and inlet ports in the cylinder wall. It is understood that the lowest edge of the projection $C^2$ of the detachable cylinder head C is on the same level as the upper edge J of the exhaust and inlet ports in the cylinder wall.

Figs. 6, 7, 8, and 9 represent as we have seen the same parts and diagrams for the existing types as is shown in Figs. 1, 2, 3, and 4 for the present construction in order to show the difference more clearly. Before we explain Figs. 10, 11, 12 and 13 it is better and more convenient to draw a comparison between those former figures, first between Figs. 1 and 6 and then between Figs. 3 and 4 and Figs. 8 and 9.

In Fig. 1 the outer sleeve is leading the inner sleeve by 90 deg.; in Fig. 6 the inner sleeve is leading the outer sleeve by 90 deg. The rotation of both camshafts (eccentric shafts, rather) is in clockwise direction. It is evident that in both arrangements both sleeves can be made to move up and down according to a clockwise or counterclockwise direction of movement of the eccentric shaft, but the lead is correlated with and depends entirely upon the relative position of the inlet and exhaust slots in the outer sleeve with respect to the inlet and exhaust port in the cylinder wall. In Fig. 1 the engine is drawn at the moment that the exhaust closes. It is seen that the lower edge of the exhaust slot in the outer sleeve B closes upwardly the upper part of the exhaust port F in the cylinder wall, while in Fig. 6 where the engine is drawn in the same position, the lower edge of the exhaust slot in the outer sleeve closes downwardly the lower part of the exhaust port F in the cylinder wall. The thickness of the inner sleeve in the existing types is approximately $\frac{1}{10}$ of an inch which leaves a slot which is greater than the average area of the exhaust opening left open by the outer sleeve with respect to the exhaust port in the cylinder wall during the last 45 deg. travelled by the piston before it reaches the top dead center position. It is evident that the arrangement shown in Fig. 1 gives more room and a straight passageway for the escaping exhaust gases than the arrangement shown in Fig. 6, especially if the sleeves are made much thinner than the ones in present use. Recent practice in Europe has proved that the thickness of the sleeves can be reduced to 1,5 m. m. so that the arrangement of Fig. 1 will be far superior to the arrangement of Fig. 6. These thin sleeves allow speeds up to 4000 revolutions per minute without serious vibration due to the unbalance of the primary inertia forces of the sleeves; greater stroke and consequently higher ports can be applied and the importance of the total arrangement of Fig. 1 over Fig. 6 increases. The increase of the inlet area shown in Fig. 4 compared with Fig. 9 becomes of greater importance, because the volumetric efficiency decreases very seriously at high speeds. If the light sleeves allow higher speeds, the inlet areas should be capable to maintain the efficiency at those speeds.

In general the more or less conical combustion chamber as shown in Figs. 1 and 6 is superior to the present combustion chamber in sleeve valve engines which consists partially of a cylinder and a cone or half sphere. The ratio of surface to volume is more favorable in the former conical chamber than in the standard chamber, the loss of heat is decreased and the volume is exploded much quicker. As is known already several years there is always a part of the gas which is unburnt due to chilling and stagnation of the gas and this amount can be decreased by decreasing the surface of contact between gas and walls of the explosion chamber and by increasing the turbulence at the moment of greatest compression. In both Figs. 1 and 6 it is shown, that the area is decreased and the turbulence increased. This form of combustion chamber can be applied to any sleeve valve engine, in which one or more sleeves move between the piston and the cylinder wall, and in which the sleeves admit to and discharge gases from the cylinder bore, but not from the more narrow expansion chamber. At the moment of explosion they are practically out of contact with the hot exploded gases during a considerable time of the explosion. This form of explosion chamber is probably for a great deal responsible for the fact, that a higher compression without detonation can be used in this type than in the standard type for sleeve valve engines. The conical shape is inductive to the dispersion of burnt gases in the top of the chamber together with the relatively large compression surface between piston and detachable head.

Figs. 2 and 7 show the position of the sleeves seen from the top and show consequently no difference on account of the position of the section SIA. My arrangement favors highly or rather makes possible a construction whereby the upper edge of the piston I can approach the projecting edge $C^2$ of the detachable cylinder head C in the inner sleeve so nearly that it will create a violent turbulence of gases in the explosion chamber at the end of the compression period exactly before explosion takes place.

The construction embodied in this invention involves the formation of a thin layer of gas, which is entrapped in the clearance space N, between the portion K of the piston and the portion $C''$ of the cylinder head C. The clearance can be made a minimum, which is compatible with a reciprocating movement. The influence of the cooperation between the cylinder head and the piston is already appreciable before this minimum is reached. This entrapped layer of gas is lost in a thermo-dynamical sense. Though more particularly described as being applicable to an internal combustion engine with two sleeves, it is to be understood that the invention may be employed with single sleeve types and three sleeve types as shown in my application No. 70,863. A higher compression ratio could be used with this construction, which resulted in higher thermal efficiency of about 10 to 75% and greater fuel economy. The pressure created on the piston is uniformly distributed over its entire surface contrary to the condition in existing poppet valve engines with a Ricardo head in which the pressure of the explosion is on one side of the piston, tending to tip it towards the cylinder wall.

Now we will compare Fig. 3 representing the exhaust period of my construction not with Fig. 8 of the exhaust period of the existing constructions, but with Fig. 9 representing the inlet period and consequently we will compare Fig. 4, not with Fig. 9, but with Fig. 8. We see that the diagrams in Figs. 8 and 9 compared with the diagrams in Fig. 3 and 4 show crosswise a certain resemblance. The exhaust period shown in Fig. 3 resembles the inlet period of Fig. 9, but the areas are not identical. The inlet period shown in Fig. 4 resembles the exhaust period of Fig. 8 and the areas are again not identical. The greatest part of the exhaust shown in Fig. 3 takes place while the inner sleeve travels downwards, the outer sleeve upwards; the greatest part of the inlet period shown in Fig. 9 takes place while the inner sleeve travels upwards and the outer sleeve downwards. Likewise the inner and outer sleeve during the greatest part of the inlet period shown in Fig. 4 travel upwards and during the greatest part of the exhaust period shown in Fig. 9 the sleeves both travel downwards. It is especially to be noted that the sleeves in Fig. 3 and 4 travel both downward during the entire explosion period, while in Figs. 8 and 9 it is seen that they travel in opposite directions during the entire explosion period.

Summarizing, we see in Figs. 3 and 4 by the full line arrows and dash-line arrows both sleeves travel in the same direction during the entire explosion period and the greatest part of the inlet period, and in opposite direction during the greatest part of the exhaust period and the entire compression period. In Figs. 8 and 9 we see however that during the entire explosion period and the greatest part of the inlet period both sleeves travel in opposite direction and during the greatest part of the exhaust period and the entire compression period in the same direction.

It is to be noted that in these four mathematical diagrams of Figs. 3 and 4 and Figs. 8 and 9, it is supposed:

1. That the exhaust and inlet ports in the cylinder wall have the same dimension and are on the same level.

2. That the exhaust and inlet slots in the outer sleeve remain during 360 deg. of revolution of the crankshaft in front of the exhaust and inlet port in the cylinder wall and that these slots are separated from each other at a distance equal to the height of the exhaust and inlet ports in the cylinder wall.

3. That the stroke of both sleeves is supposed to be equal and about 1⅛" and that the eccentric shaft rotates at half engine speed.

4. That the exhaust period and inlet period is supposed to be each 225 deg. and the explosion and compression period each 135 deg.

5. That the slots in the inner sleeve have a greater height than the slots in the outer sleeve.

It is evident that all those conditions can be changed a little in order to obtain a more favorable exhaust and inlet area and a more favorable duration. As a general rule it is preferred to make the exhaust period approximately 30 deg. longer than the inlet period.

After we have drawn a comparison between the existing types and the proposed construction I will show the actual positions of the sleeves at the most important moments in the function of the engine.

Figs. 10, 11, 12 and 13 show the positions of the exhaust and inlet slots in the inner sleeve A and the outer sleeve B at the end of the four cycles with respect to the positions of the ports in the cylinder wall respectively F and E and shows the position of the piston I with respect to the projecting edge C² and the position of the upper broad piston ring with respect to the inlet and exhaust port in the inner sleeve A.

Fig. 10 gives the position of all the mentioned parts at the end of the compression period and the beginning of the explosion period. The inner sleeve is about at its highest position and the lower edge of the exhaust slot in the outer sleeve is about to uncover the upper edge J of the exhaust port F in the cylinder wall. The upper of the exhaust slot in the outer sleeve B just covers the lower edge K of the inlet port E in the cylinder wall.

Fig. 11 gives the positions of all the mentioned parts, except the piston which is approximately 135 deg. on its way downwards, at the end of the explosion period and the beginning of the exhaust period. The lower edge of the exhaust and inlet slot in the inner sleeve A just uncovers the lowest edge of the projecting edge C² and the lower edge of the exhaust slot in the outer sleeve B reaches almost the lower edge K of the exhaust port F in the cylinder wall. The inlet slot in the outer sleeve B has reached almost its lowest position and is far down from the lower edge K of the inlet port E in the cylinder wall.

Fig. 12 gives the positions of all the mentioned parts at the end of the exhaust period and the beginning of the inlet period. The inner sleeve A has reached its lowest position and the lower edge of the exhaust slot in the outer sleeve B reaches again the upper edge J of the exhaust port F in the cylinder wall, and the upper edge of the inlet slot in the outer sleeve B reaches again the lower edge K of the inlet port E in the cylinder wall.

Fig. 13 gives the positions of all the mentioned parts, except the piston which is 135 deg. on its way downwards, at the end of the inlet period and the beginning of the compression period. The lower edge of the exhaust and inlet slots in the inner sleeve have reached again the edge of the projecting edge C² and the exhaust slot in the outer sleeve B has reached its highest position, while the upper edge of the inlet slot in the outer sleeve B has already reached again the upper edge J of the inlet port E in the cylinder wall and is on its way downwards.

Having now described my invention, what I claim in this application is:

1. In a sleeve valve internal combustion engine, comprising a cylinder, two concentric sleeve valves within said cylinder, a reentrant head within said sleeves and a reciprocating piston within the inner one of said sleeves, an exhaust port opposite an inlet port in said cylinder communicating with the space inside said sleeves and below said head, an exhaust port opposite an inlet port in the inner sleeve at its upper end at about the same level, an exhaust port opposite an inlet port in the outer sleeve, said exhaust port above the level of the inlet port, connecting rod attached to said sleeves at their lower ends, said connecting rods attached to cranks on an eccentric shaft, the connecting rod of the outer sleeve attached to a crank which moves ahead of that of the inner sleeve, said eccentric shaft rotating at half engine speed, said sleeves covering and uncovering their exhaust and inlet ports and the cylinder ports as follows, the lower edge of the exhaust port in the outer sleeve uncovers the exhaust port in the cylinder downwardly, the exhaust port in the inner sleeve being uncovered downwardly in cooperation with the lower edge of the detachable head, the lower edge of the exhaust port in the outer sleeve closing the exhaust port in the cylinder upwardly, its lower edge passing the upper edge of the exhaust port in the cylinder; the inlet port in the outer sleeve uncovering the inlet port in the cylinder upwardly, the upper edge of the inlet port in the outer sleeve passing the lower edge of the inlet port in the cylinder; the lower edge of the inlet port in the inner sleeve passing over the lower edge of the reentrant head to cover the inlet port in this sleeve, the lower edge of this inlet port in this sleeve having passed downwardly this lower edge of the head to uncover this inlet port in this inner sleeve; the inlet port in the outer sleeve covering the inlet port in the cylinder downwardly, the upper edge of the inlet port in the outer sleeve passing over the lower edge of the inlet port in the cylinder.

2. The combination of claim 1 in which the piston approaches said reentrant head about simultaneously with the approach of the lower edge of the exhaust port in the outer sleeve towards the upper edge of the exhaust port in the cylinder, thereby providing a straight passage to the atmosphere for the exhaust gases towards the end of the exhaust period.

3. A sleeve valve engine comprising a cylinder with an exhaust opposite an inlet port, two concentric sleeves, each provided with an exhaust port opposite an inlet port, a reentrant head and a reciprocating piston within said sleeves, of which the exhaust period is started by the cooperation of the lower edge of the exhaust port in the inner sleeve and the lower edge of said reentrant head, of which the exhaust period is closed by the cooperation of the lower edge of the exhaust port in the outer sleeve and the upper edge of the exhaust port in the cylinder; in which the inlet period starts by the cooperation of the upper edge of the inlet port in the outer sleeve and the lower edge of the inlet port in the cylinder, in which the inlet period is closed by the cooperation of the lower edge of the inlet port in the inner sleeve and the lower edge of said reentrant head, said sleeves operated from an eccentric shaft at half engine speed, said sleeves connected with connecting rods to said eccentric shaft so that the crank connected to the outer sleeve always leads that of the inner sleeve with respect to the rotation of said shaft and independent of the rotation of the engine.

4. In a sleeve valve internal combustion engine, comprising a cylinder, two concentric sleeves within said cylinder, a reentrant head within the inner sleeve of said two sleeves, an exhaust port opposite an inlet port in said cylinder, said two sleeves establishing communication between the atmosphere and the cylinder space below said reentrant head, said sleeves actuated by cranks on a shaft rotating at half engine speed, the crank attached to the outer sleeve leading that attached to the inner sleeve, the communication between the atmosphere and the cylinder being established in the following specific way; the lower edge of the exhaust port in the outer sleeve uncovering this port by moving downwardly over the upper edge of the exhaust port in the cylinder and covering said port by moving it upwardly, the inlet port in said sleeve uncovering this port by moving its upper edge upwardly over the lower edge of the inlet port in the cylinder and covering this port by moving it downwardly; the exhaust and inlet ports in the inner sleeve being uncovered downwardly and covered upwardly; in which the inlet and exhaust ports in the inner sleeve are approximately at the same level as are the exhaust and inlet port in the cylinder, the exhaust port in the outer sleeve however being substantially above the level of the inlet port in said sleeve.

JEAN A. H. BARKEIJ.